US011669143B2

United States Patent
He et al.

(10) Patent No.: US 11,669,143 B2
(45) Date of Patent: Jun. 6, 2023

(54) MANAGING A DYNAMIC TOTAL POWER LEVEL FOR AN INFORMATION HANDLING SYSTEM

(71) Applicant: Dell Products L.P., Round Rock, TX (US)

(72) Inventors: Qinghong He, Austin, TX (US); Tse An Chu, Taipei (TW); Thomas A. Shows, Leander, TX (US); Travis C. North, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 79 days.

(21) Appl. No.: 17/452,146

(22) Filed: Oct. 25, 2021

(65) Prior Publication Data

US 2023/0126809 A1 Apr. 27, 2023

(51) Int. Cl.
*G06F 1/00* (2006.01)
*G06F 1/3234* (2019.01)
*G06F 1/3206* (2019.01)
*G06F 1/20* (2006.01)
*G06T 1/20* (2006.01)

(52) U.S. Cl.
CPC ............ *G06F 1/3234* (2013.01); *G06F 1/206* (2013.01); *G06F 1/3206* (2013.01); *G06T 1/20* (2013.01)

(58) Field of Classification Search
CPC ...... G06F 1/206; G06F 1/3206; G06F 1/3234; G06T 1/20
See application file for complete search history.

(56) References Cited

U.S. PATENT DOCUMENTS

| | | | |
|---|---|---|---|
| 2011/0055596 A1* | 3/2011 | Wyatt | G06F 1/3203 345/212 |
| 2013/0151869 A1* | 6/2013 | Steinman | G06F 1/324 713/300 |
| 2013/0328890 A1* | 12/2013 | Avkarogullari | G06F 1/3206 345/501 |

\* cited by examiner

*Primary Examiner* — Nitin C Patel (74) *Attorney, Agent, or Firm* — McDermott Will & Emery LLP (57) ABSTRACT

In one embodiment, a method for managing a dynamic total power level for an information handling system includes: identifying, by a power manager of the information handling system, a first power level associated with a processor subsystem of the information handling system, the first power level based on a cooling capacity associated with the information handling system; identifying, by the power manager, a second power level associated with a graphics processing unit of the information handling system, the second power level based on a performance associated with the processor subsystem; determining, by the power manager, the dynamic total power level based on the first power level and the second power level; and modifying, by the power manager, a fixed total power level based on the dynamic total power level, the dynamic total power level causing the processor subsystem and the GPU to operate within the dynamic total power level.

18 Claims, 4 Drawing Sheets

IDENTIFY A FIRST POWER LEVEL ASSOCIATED WITH A FIRST COMPONENT OF AN INFORMATION HANDLING SYSTEM.
410

IDENTIFY A SECOND POWER LEVEL ASSOCIATED WITH A SECOND COMPONENT OF THE INFORMATION HANDLING SYSTEM.
420

DETERMINE A TOTAL POWER LEVEL BASED ON THE FIRST POWER LEVEL AND THE SECOND POWER LEVEL.
430

MODIFY A FIXED TOTAL POWER LEVEL BASED ON THE DYNAMIC TOTAL POWER LEVEL.
440

FIG. 4

MANAGING A DYNAMIC TOTAL POWER LEVEL FOR AN INFORMATION HANDLING SYSTEM

BACKGROUND

Field of the Disclosure

The disclosure relates generally to information handling systems, and in particular to managing a dynamic total power level for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed method for managing a dynamic total power level for an information handling system includes: identifying, by a power manager of the information handling system, a first power level associated with a processor subsystem of the information handling system, the first power level based on a cooling capacity associated with the information handling system; identifying, by the power manager, a second power level associated with a graphics processing unit (GPU) of the information handling system, the second power level based on a performance associated with the processor subsystem; determining, by the power manager, the dynamic total power level based on the first power level and the second power level; and modifying, by the power manager, a fixed total power level based on the dynamic total power level, the dynamic total power level causing the processor subsystem and the GPU to operate within the dynamic total power level.

In one or more of the disclosed embodiments, the method further includes: identifying, by the power manager, a change in the first power level associated with the processor subsystem; and modifying, by the power manager, the dynamic total power level based on the change in the first power level.

In one or more of the disclosed embodiments, modifying the dynamic total power level based on the change in the first power level includes: determining, by the power manager, that the change in the first power level comprises an increase in the first power level; and causing, by the power manager, the dynamic total power level to increase based on the increase in the first power level.

In one or more of the disclosed embodiments, modifying the dynamic total power level based on the change in the first power level includes: determining, by the power manager, that the change in the first power level comprises a decrease in the first power level; and causing, by the power manager, the dynamic total power level to decrease based on the decrease in the first power level.

In one or more of the disclosed embodiments, determining the dynamic total power level based on the first power level and the second power level includes: adding, by the power manager, the first power level to the second power level to generate a sum comprising the dynamic total power level.

In one or more of the disclosed embodiments, identifying the first power level associated with the processor subsystem includes: accessing, by the power manager, a memory of the information handling system, the memory storing a plurality of power profiles associated with the processor subsystem; and determining, by the power manager, a current power profile of the plurality of power profiles, the current power profile indicating the first power level.

In one or more of the disclosed embodiments, the plurality of power profiles associated with the processor subsystem includes: a memory-mapped input output (MMIO) power profile; a model-specific register (MSR) power profile; and a platform environment control interface (PECI) power profile.

In one or more of the disclosed embodiments, determining the dynamic total power level based on the first power level and the second power level includes: accessing, by the power manager, a memory of the information handling system, the memory including a look up table storing a plurality of power profiles associated with the processor subsystem, each of the plurality of power profiles including a plurality of first power levels associated with the processor subsystem, each of the plurality of first power levels corresponding to a modified second power level associated with the GPU and a modified dynamic total power level; determining, by the power manager, a current power profile of the plurality of power profiles associated with the processor subsystem; identifying, by the power manager, a current first power level of the plurality of first power levels associated with the processor subsystem; selecting, by the power manager, the modified second power level from the look up table based on the current first power level; and selecting, by the power manager, the modified dynamic total power level from the look up table based on the modified second power level.

In one or more of the disclosed embodiments, the cooling capacity associated with the information handling system is based on a skin temperature associated with the information handling system.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes a method for managing a dynamic total power level for an information handling system that includes: identifying, by a power manager of the information handling system, a first power level associated with a processor subsystem of the information handling system, the first power level based on a cooling capacity associated with the information handling system; identifying, by the power manager, a second power level associated with a graphics processing unit (GPU) of the information handling system, the second power level based on a performance associated with the processor subsystem; determining, by the power manager, the dynamic total power level based on the first power level and the second power level; and modifying, by the power manager, a fixed total power level based on the dynamic total power level, the dynamic total power level causing the processor subsystem and the GPU to operate within the dynamic total power level.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Figure 1:
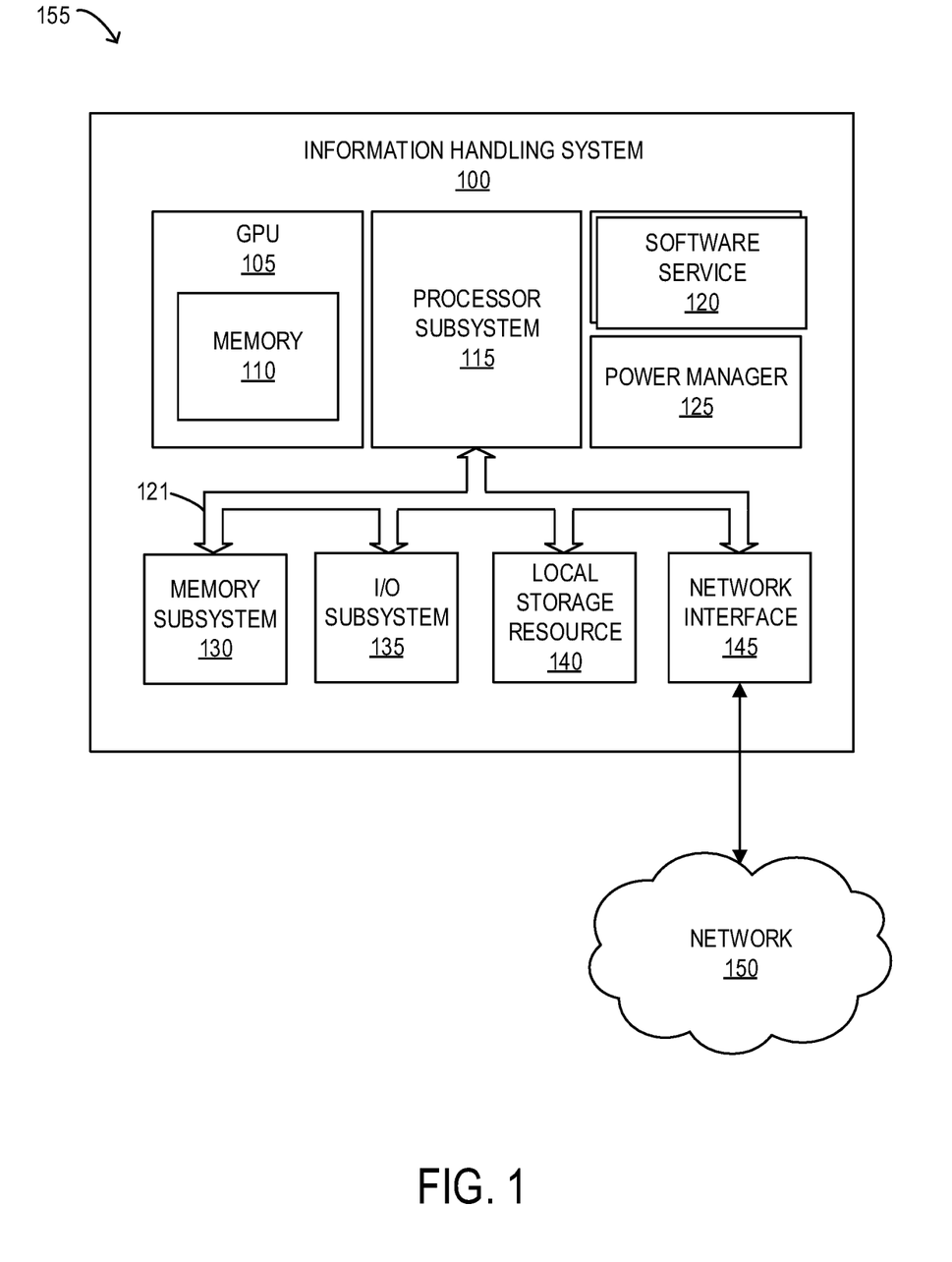
FIG. 1 is a block diagram of selected elements of an embodiment of a computing environment that includes an information handling system.

Turning now to the drawings, FIG. 1 is a block diagram of selected elements of an embodiment of a computing environment that includes an information handling system. Specifically, FIG. 1 illustrates a block diagram depicting selected elements of an information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 115, which may comprise one or more processors, and system bus 121 that communicatively couples various system components to processor subsystem 115 including, for example, a memory subsystem 130, an I/O subsystem 135, a local storage resource 140, and a network interface 145. System bus 121 may represent a variety of suitable types of bus structures (e.g., a memory bus, a peripheral bus, or a local bus) using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express (PCIe) bus, HyperTransport (HT) bus, and Video Electronics Standards Association (VESA) local bus. As shown in FIG. 1, information handling system 100 may additionally include a graphics processing unit (GPU) 105 including a memory 110, one or more software services 120, and a power manager 125. In other embodiments, computing environment 155 may include additional, fewer, and/or different components than the components shown in FIG. 1.

In information handling system 100, processor subsystem 115 may comprise a system, device, or apparatus operable to interpret and/or execute program instructions and/or process data, and may include a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 115 may interpret and/or execute program instructions and/or process data stored locally (e.g., in memory subsystem 130 and/or another component of information handling system 100). In the same or alternative embodiments, processor subsystem 115 may interpret and/or execute program instructions and/or process data stored remotely. In one embodiment, processor subsystem 115 may be or include a multi-core processor comprised of one or more processing cores disposed upon an integrated circuit (IC) chip. In other embodiments, processor subsystem 115 may be or include an integrated device (e.g., microcontroller, system on a chip (SoC), and the like) that includes dedicated memory, peripheral interfaces, and/or other components suitable for interpreting and/or executing program instructions and/or processing data.

The power required by each dedicated component of processor subsystem 115 to operate may comprise an overall power consumption, or a "power level," of processor subsystem 115 (e.g., 15 W, 30 W, and the like). In one embodiment, the power level associated with processor subsystem 115 may be or include Power Level 1 (PL1) and/or Power Level 2 (PL2) values representing respective amounts of power consumed by processor subsystem 115 during operation. Respective power levels of processor subsystem 115 may each consume a portion of an overall power budget, or a "dynamic total power level," associated with information handling system 100. For example, processor subsystem 115 may operate at a power level of 30 W within a dynamic total power level of 120 W, thereby consuming 25% of the dynamic total power level distributed across processor subsystem 115 and GPU 105. In addition, respective power levels of processor subsystem 115 may generate corresponding operating temperatures of processor subsystem 115 that may contribute, in part, to an overall operating temperature of information handling system 100.

In one embodiment, the power level associated with processor subsystem 115 may be decreased (e.g., by software service 120) such that the overall operating temperature of information handling system 100 may be decreased accordingly. However, such decrease in power level may cause a corresponding decrease in performance of processor subsystem 115 and/or information handling system 100. In another embodiment, the power level associated with processor subsystem 115 may be increased (e.g., by software service 120), thereby increasing performance of processor subsystem 115 and/or information handling system 100 while causing the overall operating temperature of information handling system 100 to increase accordingly. In such instances, the overall operating temperature of information handling system 100 may exceed a cooling capacity of information handling system 100 (e.g., greater than 38° C.), which may cause damage to internal components of information handling system 100 and/or processor subsystem 115. Processor subsystem 115 is described in further detail with respect to FIGS. 2 and 3.

In one embodiment, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 135 may comprise a system, device, or apparatus generally operable to receive and/or transmit data to, from, and/or within information handling system 100. I/O subsystem 135 may represent, for example, a variety of communication interfaces, graphics interfaces, video interfaces, user input interfaces, and/or peripheral interfaces. In various embodiments, I/O subsystem 135 may be used to support various peripheral devices, such as a touch panel, a display adapter, a keyboard, an accelerometer, a touch pad, a gyroscope, an IR sensor, a microphone, a sensor, a camera, or another type of peripheral device.

In one embodiment, local storage resource 140 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data.

In one embodiment, network interface 145 may be a suitable system, apparatus, or device operable to serve as an interface between information handling system 100 and a network 150. Network interface 145 may enable information handling system 100 to communicate over network 150 using a suitable transmission protocol and/or standard, including, but not limited to, transmission protocols and/or standards enumerated below with respect to the discussion of network 150. Network 150 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), a Cloud network, an Edge network, an intranet, the Internet or another appropriate architecture or system that facilitates the communication of signals, data and/or messages (generally referred to as data). Network interface 145 may enable wired and/or wireless communications (e.g., NFC or Bluetooth) to and/or from information handling system 100.

In particular embodiments, network 150 may include one or more routers for routing data between client information handling systems 100 and server information handling systems 100. A device (e.g., a client information handling system 100 or a server information handling system 100) on network 150 may be addressed by a corresponding network address including, for example, an Internet protocol (IP) address, an Internet name, a Windows Internet name service (WINS) name, a domain name or other system name. In particular embodiments, network 150 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

In one embodiment, network 150 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 150 and its various components may be implemented using hardware, software, or any combination thereof.

In one embodiment, GPU 105 may be a suitable system, apparatus, or device operable to support dedicated graphics for information handling system 100. Specifically, GPU 105 may generate a feed of output images to be displayed to a user of information handling system (e.g., via I/O subsystem 135). In one embodiment, GPU 105 may include a random-access memory (RAM) and power regulators specifically designed for processing video images to offload processing demands on a central processing unit (CPU) (e.g., processor subsystem 115) of information handling system 100 and system RAM (e.g., memory subsystem 130). The power required by each of these dedicated components to operate may comprise an overall power consumption, or a "power level," of GPU 105 (e.g., 90 W, 110 W, and the like). In one embodiment, the power level associated with GPU 105 may be or include a Total Graphics Power (TGP) value representing an amount of power consumed by GPU 105 during operation. Respective power levels of GPU 105 may each consume a portion of the dynamic total power level associated with information handling system 100. For example, GPU 105 may operate at a power level of 90 W within a dynamic total power level of 120 W, thereby consuming 75% of the dynamic total power level distributed across GPU 105 and processor subsystem 115. In addition, respective power levels of GPU 105 may generate corresponding operating temperatures of GPU 105 that may contribute, in part, to an overall operating temperature of information handling system 100.

In one embodiment, the power level associated with GPU 105 may be decreased (e.g., by software service 120) such that the overall operating temperature of information handling system 100 may be decreased accordingly. However, such decrease in power level may cause a corresponding decrease in performance of GPU 105. In another embodiment, the power level associated with GPU 105 may be increased (e.g., by software service 120), thereby increasing performance of GPU 105 while causing the overall operating temperature of information handling system 100 to increase as well. In such instances, the overall operating temperature of information handling system 100 may exceed a cooling capacity of information handling system 100 (e.g., greater than 38° C.), which may cause damage to internal components of information handling system 100 and/or GPU 105. Operating temperatures may be further increased in higher-end GPUs (e.g., such as those designed for 3D rendering, gaming, virtual reality (VR), and the like). GPU 105 is described in further detail with respect to FIGS. 2 and 3.

In one embodiment, memory 110 may comprise a system, device, or apparatus operable to retain and/or retrieve program instructions and/or data for a period of time (e.g., computer-readable media). Memory 110 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, each software service 120 (collectively referred to herein as "software services 120") may comprise a system, device, or apparatus operable to manage an operating temperature of one or more components, or devices, of information handling system 100. In particular, software service 120 may be or include one or more software applications operable to dynamically allocate power (i.e., a dynamic total power level) between GPU 105 and processor subsystem 115 automatically to optimize performance, balance workload, and/or increase device lifespan. In one embodiment, two or more software services 120 may operate in tandem to allocate dynamic total power level across processor subsystem 115 and GPU 105. In this embodiment, a first software service 120 may monitor an operating temperature associated with processor subsystem 115 and/or an operating temperature of information handling system 100. In one embodiment, one or more sensors may be disposed on a motherboard (not shown in figure) of information handling system 100 such that the one or more sensors may sense, or otherwise detect, the operating temperature associated with information handling system 100. For example, one or more sensors may sense, or otherwise detect, a surface temperature, or "skin temperature," associated with one or more covers (i.e., C cover, D cover, and the like) comprising a housing of information handling system 100. In this example, the operating temperature of information handling system 100 may be sensed, or otherwise detected, directly and/or indirectly by the one or more sensors based on the skin temperature. The first software service 120 may cause an increase or decrease in the power level of processor subsystem 115 based on a cooling capacity of information handling system 100. Here, the cooling capacity of information handling system 100 may correspond to, and/or be based on, an overall operating temperature (e.g., a skin temperature) of information handling system 100. For example, an operating temperature, or skin temperature, of 23° C. may increase cooling capacity given the lower operating temperature, thereby allowing processor subsystem 115 to operate at higher power levels to optimize performance. Conversely, an operating temperature, or skin temperature, of 35° C. may decrease cooling capacity and restrict processor subsystem 115 from operating at higher power levels to avoid causing information handling system 100 to overheat.

In addition, a second software service 120 may monitor the performance of processor subsystem 115 to dynamically allocate an increased or decreased portion of the dynamic total power level to GPU 105 based on the performance of processor subsystem 115. For example, in response to monitoring a change in the power level of processor subsystem 115 from 30 W to 15 W caused by the first software service 120 (i.e., due to decreased cooling capacity), the second software service 120 may increase the power level of GPU 105 to optimize performance within the dynamic total power level allocated across GPU 105 and processor subsystem 115. In one embodiment, software service 120 may be or include Dynamic Tuning Technology (DTT) operable to increase and/or decrease the power level of processor subsystem 115 based on cooling capacity of information handling system 100. In another embodiment, software service 120 may be or include one or more software drivers (e.g., Dynamic Boost) operable to increase and/or decrease the power level of GPU 105 based on the performance (i.e., power level) of processor subsystem 115. Software services 120 are described in further detail with respect to FIGS. 2 and 3.

In one embodiment, power manager 125 may comprise a system, device, or apparatus operable to manage a dynamic total power level for information handling system 100. In particular, power manager 125 may be or include one or more software applications operable to determine a dynamic total power level allocated across processor subsystem 115 and GPU 105 based on respective power levels. Conventionally, the total power level distributed across, or otherwise allocated to, processor subsystem 115 and GPU 105 for consumption may comprise a predetermined, fixed total power level such that the total power level remains immutable despite fluctuations in cooling capacity as operating temperatures of information handling system 100 increase and/or decrease. As such, software services 120 may inadvertently restrict performance of processor subsystem 115 and/or GPU 105 at higher cooling capacities (i.e., when total power level may be increased) to remain within a fixed total power level. Similarly, software services 120 may inadvertently cause information handling system 100 to overheat at lower cooling capacities (i.e., when total power level should be decreased) to remain within the fixed total power level that may exceed the cooling capacities of information handling system 100. In contrast, power manager 125 may determine a dynamic total power level based on respective power levels of processor subsystem 115 and GPU 105 to remain within the cooling capacity of information handling system 100 while optimizing overall system performance. That is, power manager 125 may modify a fixed total power level to instead allocate a dynamic total power level for consumption across processor subsystem 115 and GPU 105 such that software services 120 may cause processor subsystem 115 and GPU 105 to operate within the dynamic total power level. This dynamic total power level allows increased performance of processor subsystem 115 and GPU 105 at higher cooling capacities (e.g., overall operating temperature of information handling system 100 below 28° C.) while preventing overheating at lower cooling capacities (e.g., e.g., overall operating temperature of information handling system 100 above 28° C.).

In one embodiment, to determine a dynamic total power level for information handling system 100, power manager 125 may first identify a power level associated with processor subsystem 115. Specifically, power manager 125 may identify the power level associated with processor subsystem 115 and may modify the dynamic total power level for information handling system 100 based, in part, on the power level. In one embodiment, power manager 125 may access a memory (e.g., memory subsystem 130) to identify a power setting, or a "power profile," associated with processor subsystem 115. Here, memory subsystem 130 may include one or more registers, and/or regions of memory, used to store various power profiles associated with processor subsystem 115. For example, memory subsystem 130 may include a register, or region of memory, that corresponds to a memory-mapped input output (MMIO) power profile that indicates a power level of processor subsystem 115 required for performing I/O operations across one or more applications and/or hardware devices operating on information handling system 100 at a given time. In another example, memory subsystem 130 may include a register, or region of memory, that corresponds to a model-specific register (MSR) power profile that indicates a power level of processor subsystem 115 required for debugging, program execution tracing, performance monitoring, and/or toggling certain features associated with processor subsystem 115. In yet another example, memory subsystem 130 may include a register, or region of memory, that corresponds to a Platform Environment Control Interface (PECI) power profile that indicates a power level of processor subsystem 115 required for thermal management of one or more components communicably coupled to, or otherwise utilizing, a PECI bus disposed within information handling system 100. In one embodiment, power manager 125 may determine a current power profile of the power profiles stored in memory subsystem 130 by selecting the power profile indicating the lowest power level. For example, given an MMIO power profile indicating a power level of 40 W, an MSR power profile indicating a power level of 60 W, and a PECI power profile indicating a power level of 45 W, power manager 125 may determine that the MMIO power profile is the current power profile given the power level of 40 W. The current power profile may indicate the power level associated with, or otherwise consumed by, processor subsystem 115 (i.e., which typically follows the lowest power profile by industry standard).

In one embodiment, power manager 125 may identify a power level associated with GPU 105. In particular, power manager 125 may identify the power level associated with GPU 105 and may modify the dynamic total power level for information handling system 100 based on the power levels associated with processor subsystem 115 and GPU 105. In one embodiment, power manager 125 may access a memory (e.g., memory 110) of GPU 105 to identify a current power level of GPU 105. For example, memory 110 may include one or more registers, and/or regions of memory, used to store various power levels (e.g., 90 W, 110 W, and the like) at which GPU 105 may operate based on performance of processor subsystem 115. In this example, the various power levels may be accessed by software services 120 and applied to the operation of GPU 105 to remain within the dynamic total power level as described above. In another embodiment, power manager 125 may access a memory (e.g., memory subsystem 130) of information handling system 100 to identify a current power level of GPU 105. For example, memory subsystem 130 may include one or more registers, and/or regions of memory, used to store various power levels (e.g., 90 W, 110 W, and the like) at which GPU 105 may operate based on performance of processor subsystem 115. In yet another embodiment, power manager 125 may communicate with software service 120 to identify a current power level of GPU 105.

In one embodiment, power manager 125 may determine a dynamic total power level for information handling system 100. Specifically, power manager 125 may determine the dynamic total power level for information handling system 100 based on the power level associated with processor subsystem 115 and the power level associated with GPU 105. In one embodiment, power manager 125 may modify a fixed total power level by adding the power level associated with processor subsystem 115 to the power level associated with GPU 105 to generate a sum comprising the dynamic total power level distributed across processor subsystem 115 and GPU 105. For example, power manager 125 may execute circuitry operable to perform the mathematical operation $TPL=PL_{ps}+PL_{GPU}$, where TPL represents a dynamic total power level for information handling system 100, $PL_{ps}$ represents a power level associated with processor subsystem 115, and $PL_{GPU}$ represents a power level associated with GPU 105. That is, power manager 125 may identify the power levels of processor subsystem 115 and GPU 105 as described above and may perform an addition operation to determine the dynamic total power level to be collectively consumed by processor subsystem 115 and GPU 105 during operation. Because the power levels of processor subsystem 115 and GPU 105 may increase and/or decrease during operation, the sum comprising the dynamic total power level distributed across processor subsystem 115 and GPU 105 may dynamically increase and/or decrease accordingly.

In one embodiment, power manager 125 may identify a change in the power level associated with processor subsystem 115 and may modify the dynamic total power level based on the identified change in power level. For example, power manager 125 may determine that a change in the power level associated with processor subsystem 115 comprises an increase in power level (i.e., due to increased cooling capacity of information handling system 100) and may cause the dynamic total power level to increase based on the increase in power level. In this example, software service 120 may additionally cause an increase in the power level associated with GPU 105 to optimize performance of GPU 105 while remaining within the increased dynamic total power level of information handling system 100. In another example, power manager 125 may determine that a change in the power level associated with processor subsystem 115 comprises a decrease in power level (i.e., due to decreased cooling capacity of information handling system 100) and may cause the dynamic total power level to decrease based on the decrease in power level. In this example, software service 120 may additionally cause a decrease in the power level associated with GPU 105 to prevent information handling system 100 from overheating given the decreased cooling capacity. In this way, power manager 125 may dynamically account for fluctuations in cooling capacity as operating temperatures of information handling system 100 increase and/or decrease, thereby optimizing system performance and increasing overall user experience. Power manager 125 is described in further detail with respect to FIGS. 2 and 3.

Figure 2:
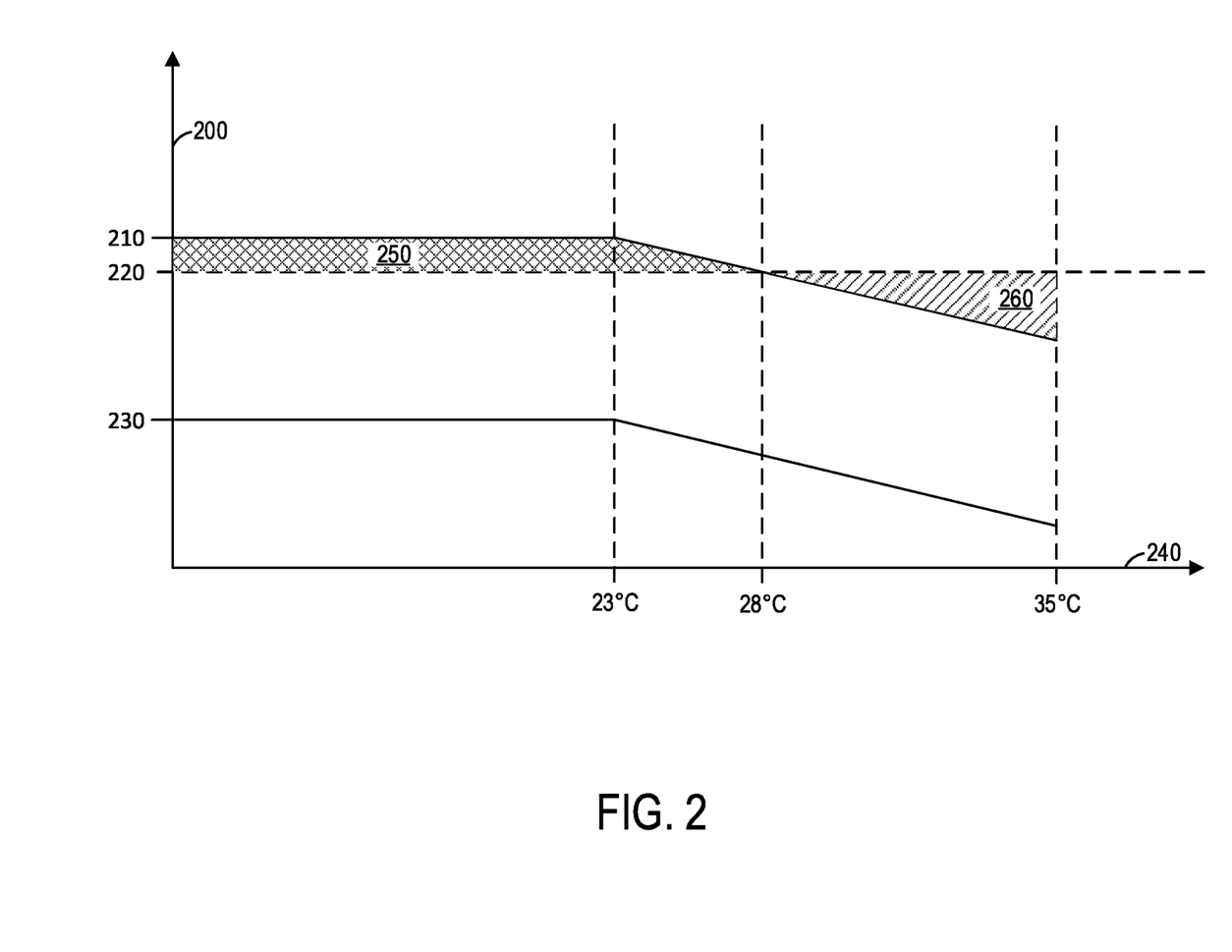
FIG. 2 is a line graph depicting selected elements of an embodiment of a dynamic total power level of an information handling system.

FIG. 2 is a line graph depicting selected elements of an embodiment of a dynamic total power level of an information handling system. In the embodiment illustrated in FIG. 2, it may be assumed that the power level 230 of processor subsystem 115 follows, indicates, or otherwise corresponds to the cooling capacity of information handling system 100. For example, software service 120 may monitor an operating temperature 240 of information handling system 100 and may cause an increase or decrease in the power level 230 of processor subsystem 115 based on a cooling capacity of information handling system 100 as described above with respect to FIG. 1. In other embodiments, the operating temperatures 240 (i.e., 23° C., 28° C., and 35° C.) and/or power levels 200 (i.e., power levels 210, 220, and 230) depicted in FIG. 2 may be greater than, less than, and/or different from the operating temperatures 240 and/or power levels 200 shown in the embodiment illustrated in FIG. 2.

As shown in the line graph illustrated in FIG. 2, power manager 125 may modify the dynamic total power level 210 of information handling system 100 based on increases and/or decreases in the operating temperature 240 of information handling system 100. Specifically, power manager 125 may increase the dynamic total power level 210 (i.e., in relation to a conventional, fixed total power level 220) at lower operating temperatures 240 where cooling capacity may be greater. This is shown in FIG. 2 where the dynamic total power level 210 is at a higher power level 200 than the conventional, fixed total power level 220 (described above with respect to FIG. 1) at operating temperatures 240 less than 28° C. As shown in FIG. 2, this higher power level 200 of the dynamic total power level 210 may exploit the overhead power 250 that might have otherwise been unavailable, or wasted, using the conventional, fixed total power level 220 shown to be below the overhead power 250 region. Similarly, power manager 125 may decrease the dynamic total power level 210 (i.e., in relation to the conventional, fixed total power level 220) at higher operating temperatures 240 where cooling capacity may be lower, or otherwise diminished. This is shown in FIG. 2 where the dynamic total power level 210 is at a lower power level 200 than the conventional, fixed total power level 220 at operating temperatures 240 greater than 28° C. As shown in FIG. 2, this lower power level 200 of the dynamic total power level 210 may prevent excess power 260 that might have otherwise caused information handling system 100, and/or the devices therein, to overheat using the conventional, fixed total power level 220 shown to be above the excess power 260 region. Therefore, power manager 125 may dynamically account for fluctuations in cooling capacity (i.e., as indicated by power level 230 shown in FIG. 2) as operating temperatures 240 of information handling system 100 increase and/or decrease.

Figure 3:
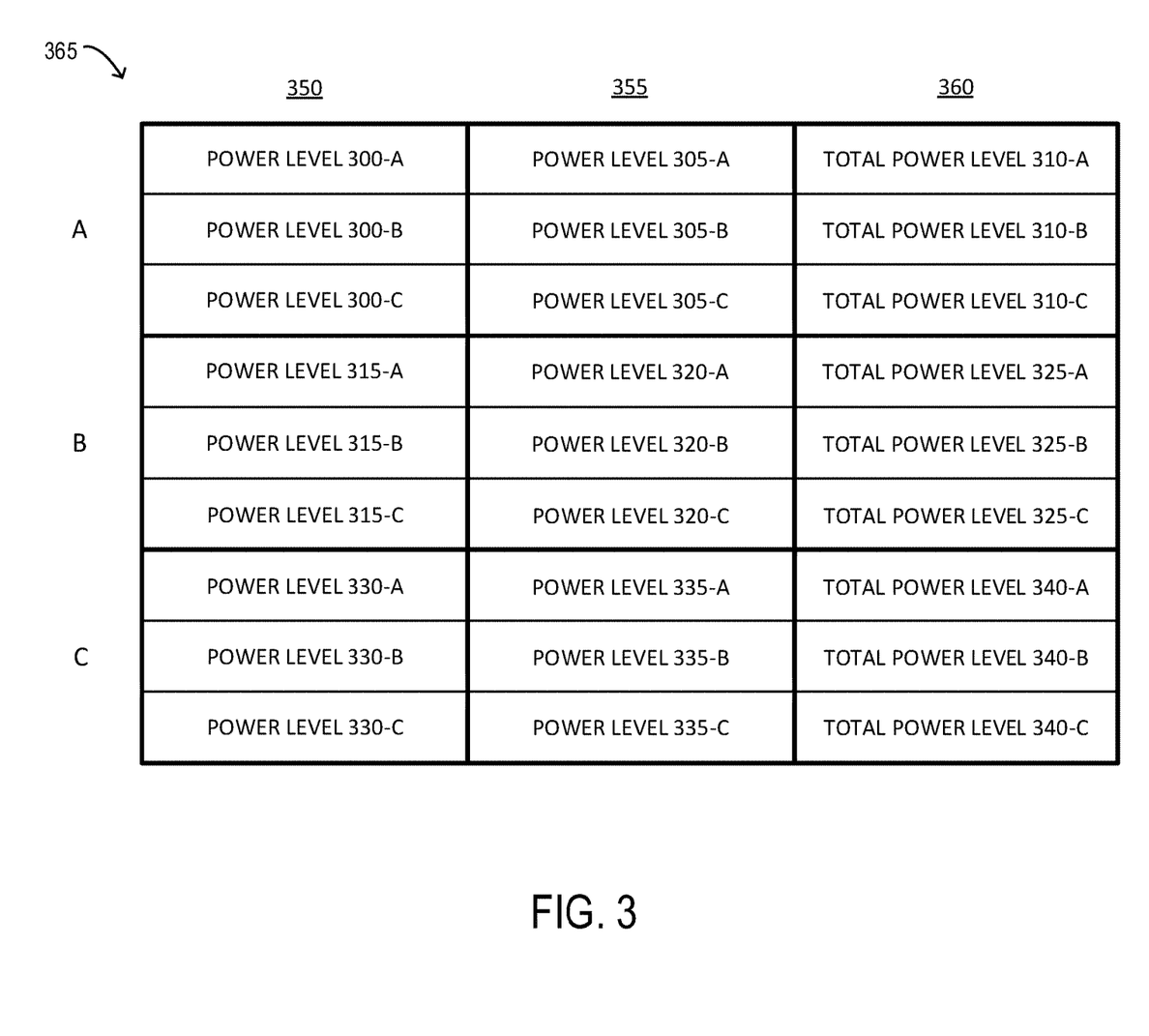
FIG. 3 illustrates selected elements of a look up table stored in a memory of an information handling system.

FIG. 3 illustrates selected elements of a look up table stored in a memory of an information handling system. In the embodiment illustrated in FIG. 3, look up table 365 may be stored in a memory (e.g., memory subsystem 130) of information handling system 100 such that power manager 125 may access look up table 365 to determine a power level 355 for GPU 105 and/or a dynamic total power level 360 for information handling system 100 based on a power level 350 of processor subsystem 115. As shown in FIG. 3, look up table 365 may include power profiles A, B, and C that each include various power levels 350 and 355. Specifically, power level 350 may correspond to a current power level of processor subsystem 115 (i.e., from power levels 300-A through 330-C). Each power level 350 in look up table 365 within a power profile A, B, and C may correspond to a power level 355 indicating, or otherwise corresponding to, a modified power level associated with GPU 105 (i.e., from power levels 305-A through 335-C) and a dynamic total power level 360 indicating, or otherwise corresponding to, a modified dynamic total power level for information handling system 100 (i.e., from total power levels 310-A through 340-C). In one embodiment, power profile A may correspond to an MMIO power profile, power profile B may correspond to an MSR power profile, and power profile C may correspond to a PECI power profile. In other embodiments, look up table 365 may include additional, fewer, and/or different power profiles, power levels, and/or total power levels than those shown in the embodiment illustrated in FIG. 3.

In the embodiment illustrated in FIG. 3, power manager 125 may access memory subsystem 130 of information handling system 100 to determine a current power profile A-C associated with processor subsystem 115 as described above with respect to FIG. 1. Once determined, power manager 125 may identify a power level 350 that corresponds to a current power level of processor subsystem 115 based on the current power profile A-C. For example, power manager 125 may determine that processor subsystem 115 is operating in accordance with power profile A (i.e., an MMIO power profile) and may identify the current power level 350 to be power level 300-B (i.e., 30-45 W). Based on the identified current power level 350, power manager 125 may select a power level 355 from look up table 365 corresponding to a modified power level associated with GPU 105. For example, based on the identified current power level 350 associated with processor subsystem 115 at power level 300-B, power manager 125 may select a power level 355 from look up table 365 having power level 305-B (i.e., 90 W) corresponding to a modified power level associated with GPU 105. Similarly, based on the selected power level 355 associated with GPU 105, and/or the identified current power level 350 associated with processor subsystem 115, power manager 125 may select a dynamic total power level 360 from look up table 365 having total power level 310-B (i.e., 120 W) corresponding to a modified dynamic total power level for information handling system 100. In this way, power manager 125 may determine a dynamic total power level for information handling system 100 using look up table 365. In other embodiments, power manager 125 may determine a dynamic total power level for information handling system 100 mathematically, such as by performing an addition operation as described above with respect to FIG. 1.

Figure 4:
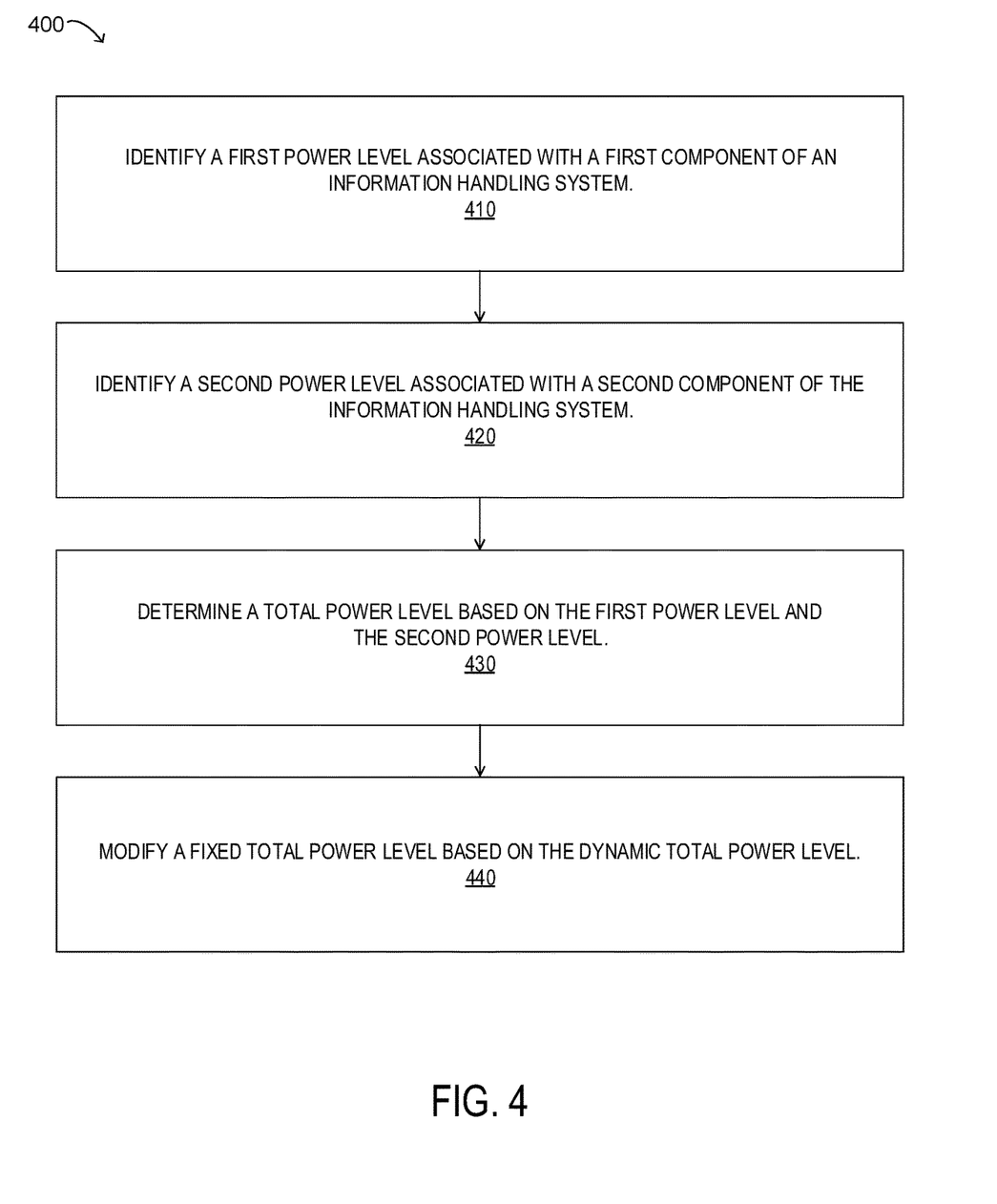
FIG. 4 is a flowchart depicting selected elements of an embodiment of a method for managing a dynamic total power level for an information handling system.

FIG. 4 is a flowchart depicting selected elements of an embodiment of a method for managing a dynamic total power level for an information handling system. It is noted that certain operations described in method 400 may be optional or may be rearranged in different embodiments.

Method 400 may begin at step 410, where a power manager may identify a first power level associated with a processor subsystem of the information handling system. The first power level may be based on a cooling capacity associated with the information handling system. For example, power manager 125 may identify a power level associated with processor subsystem 115 as described above with respect to FIG. 1. The power level 230 of processor subsystem 115 may follow, indicate, or otherwise correspond to the cooling capacity of information handling system 100 as described above with respect to FIG. 2. At step 420, the power manager may identify a second power level associated with a graphics processing unit (GPU) of the information handling system. The second power level may be based on a performance associated with the processor subsystem. For example, power manager 125 may identify a power level associated with GPU 105 as described above with respect to FIG. 1. The power level of GPU 105 may be based on the performance (i.e., power level) of processor subsystem 115 as described above with respect to FIG. 1. At step 430, the power manager may determine a dynamic total power level based on the first power level and the second power level. For example, power manager 125 may determine the dynamic total power level for information handling system 100 based on the power level associated with processor subsystem 115 and the power level associated with GPU 105 as described above with respect to FIG. 1. At step 440, the power manager may modify a fixed total power level based on the dynamic total power level. The dynamic total power level may cause the processor subsystem and the GPU to operate within the dynamic total power level. For example, power manager 125 may increase the dynamic total power level 210 (i.e., in relation to a conventional, fixed total power level 220) at lower operating temperatures 240 where cooling capacity may be greater and/or decrease the dynamic total power level 210 (i.e., in relation to the conventional, fixed total power level 220) at higher operating temperatures 240 where cooling capacity may be lower, or otherwise diminished, as described above with respect to FIG. 2. Power manager 125 may allocate a dynamic total power level for consumption across processor subsystem 115 and GPU 105 such that software services 120 may cause processor subsystem 115 and GPU 105 to operate within the dynamic total power level as described above with respect to FIG. 1.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for managing a dynamic total power level for an information handling system, the method comprising:
   identifying, by a power manager of the information handling system, a first power level associated with a processor subsystem of the information handling system, the first power level based on a cooling capacity associated with the information handling system;
   identifying, by the power manager, a second power level associated with a graphics processing unit (GPU) of the information handling system, the second power level based on a performance associated with the processor subsystem; and
   determining, by the power manager, the dynamic total power level based on the first power level and the second power level; and
   modifying, by the power manager, a fixed total power level based on the dynamic total power level, the dynamic total power level causing the processor subsystem and the GPU to operate within the dynamic total power level.

2. The method of claim 1, further comprising:
   identifying, by the power manager, a change in the first power level associated with the processor subsystem; and
   modifying, by the power manager, the dynamic total power level based on the change in the first power level.

3. The method of claim 2, wherein modifying the dynamic total power level based on the change in the first power level comprises:
   determining, by the power manager, that the change in the first power level comprises an increase in the first power level; and
   causing, by the power manager, the dynamic total power level to increase based on the increase in the first power level.

4. The method of claim 2, wherein modifying the dynamic total power level based on the change in the first power level comprises:
   determining, by the power manager, that the change in the first power level comprises a decrease in the first power level; and causing, by the power manager, the dynamic total power level to decrease based on the decrease in the first power level.

5. The method of claim 1, wherein determining the dynamic total power level based on the first power level and the second power level comprises:
adding, by the power manager, the first power level to the second power level to generate a sum comprising the dynamic total power level.

6. The method of claim 1, wherein identifying the first power level associated with the processor subsystem comprises:
accessing, by the power manager, a memory of the information handling system, the memory storing a plurality of power profiles associated with the processor subsystem; and
determining, by the power manager, a current power profile of the plurality of power profiles, the current power profile indicating the first power level.

7. The method of claim 6, wherein the plurality of power profiles associated with the processor subsystem includes:
a memory-mapped input output (MMIO) power profile;
a model-specific register (MSR) power profile; and
a platform environment control interface (PECI) power profile.

8. The method of claim 1, wherein determining the dynamic total power level based on the first power level and the second power level comprises:
accessing, by the power manager, a memory of the information handling system, the memory including a look up table storing a plurality of power profiles associated with the processor subsystem, each of the plurality of power profiles including a plurality of first power levels associated with the processor subsystem, each of the plurality of first power levels corresponding to a modified second power level associated with the GPU and a modified dynamic total power level;
determining, by the power manager, a current power profile of the plurality of power profiles associated with the processor subsystem;
identifying, by the power manager, a current first power level of the plurality of first power levels associated with the processor subsystem;
selecting, by the power manager, the modified second power level from the look up table based on the current first power level; and
selecting, by the power manager, the modified dynamic total power level from the look up table based on the modified second power level.

9. The method of claim 1, wherein the cooling capacity associated with the information handling system is based on a skin temperature associated with the information handling system.

10. An information handling system, comprising:
a graphics processing unit (GPU);
a processor subsystem including one or more processors; and
one or more computer-readable non-transitory storage media coupled to one or more of the processors and comprising instructions operable when executed by one or more of the processors to cause the system to:
identify a first power level associated with the processor subsystem, the first power level based on a cooling capacity associated with the information handling system;
identify a second power level associated with the GPU, the second power level based on a performance associated with the processor subsystem;
determine a dynamic total power level based on the first power level and the second power level; and
modify a fixed total power level based on the dynamic total power level, the dynamic total power level causing the processor subsystem and the GPU to operate within the dynamic total power level.

11. The information handling system of claim 10, wherein the processors are further operable when executed to:
identify a change in the first power level associated with the processor subsystem; and
modify the dynamic total power level based on the change in the first power level.

12. The information handling system of claim 11, wherein to modify the dynamic total power level based on the change in the first power level, the processors are further operable when executed to:
determine that the change in the first power level comprises an increase in the first power level; and
cause the dynamic total power level to increase based on the increase in the first power level.

13. The information handling system of claim 11, wherein to modify the dynamic total power level based on the change in the first power level, the processors are further operable when executed to:
determine that the change in the first power level comprises a decrease in the first power level; and
cause the dynamic total power level to decrease based on the decrease in the first power level.

14. The information handling system of claim 10, wherein to determine the dynamic total power level based on the first power level and the second power level, the processors are further operable when executed to:
add the first power level to the second power level to generate a sum comprising the dynamic total power level.

15. The information handling system of claim 10, wherein to identify the first power level associated with the processor subsystem, the processors are further operable when executed to:
access a memory of the information handling system, the memory storing a plurality of power profiles associated with the processor subsystem; and
determine a current power profile of the plurality of power profiles, the current power profile indicating the first power level.

16. The information handling system of claim 15, wherein the plurality of power profiles associated with the processor subsystem includes:
a memory-mapped input output (MMIO) power profile;
a model-specific register (MSR) power profile; and
a platform environment control interface (PECI) power profile.

17. The information handling system of claim 10, wherein to determine the dynamic total power level based on the first power level and the second power level, the processors are further operable when executed to:
access a memory of the information handling system, the memory including a look up table storing a plurality of power profiles associated with the processor subsystem, each of the plurality of power profiles including a plurality of first power levels associated with the processor subsystem, each of the plurality of first power levels corresponding to a modified second power level associated with the GPU and a modified dynamic total power level;

determine a current power profile of the plurality of power profiles associated with the processor subsystem;

identify a current first power level of the plurality of first power levels associated with the processor subsystem;

select the modified second power level from the look up table based on the current first power level; and select the modified dynamic total power level from the look up table based on the modified second power level.

18. The information handling system of claim 10, wherein the cooling capacity associated with the information handling system is based on a skin temperature associated with the information handling system.

* * * * *